United States Patent Office 3,594,307
Patented July 20, 1971

3,594,307
PRODUCTION OF HIGH QUALITY JET FUELS BY TWO-STAGE HYDROGENATION
Merritt C. Kirk, Jr., Thornton, Pa., assignor to Sun Oil Company, Philadelphia, Pa.
No Drawing. Continuation-in-part of applications Ser. No. 532,298, Mar. 7, 1966, now Patent No. 3,424,673, dated Jan. 28, 1969, and Ser. No. 781,095, Dec. 4, 1968, now Patent No. 3,481,996, dated Dec. 2, 1969, said application Ser. No. 781,095 being also a continuation-in-part of said application Ser. No. 532,298. This application Feb. 14, 1969, Ser. No. 799,499
Int. Cl. C10g 23/02
U.S. Cl. 208—57  9 Claims

ABSTRACT OF THE DISCLOSURE

Process of producing a jet fuel having a luminometer number of at least 75 comprises contacting a charge comprising jet fuel range distillate from coked (thermally cracked) tar sands bitumen (such as that separated from Athabasca tar sands by the hot water process) or a stright-run kerosene charge, or a catalytic gas oil charge, acyclic $C_9$–$C_{18}$ olefin charge (or a mixture of at least two such charges) with hydrogen in the presence of a hydrogenation catalyst formed from at least one member selected from the group consisting of nickel, cobalt, iron, molybdenum and tungsten and oxides and sulfides thereof, on an inert porous carrier, at a temperature of 500–785° F., a pressure of 350–2000 p.s.i.g., a liquid hourly space velocity of 0.5–10.0 and a hydrogen circulation rate of 0 to 20,000 s.c.f. per barrel of said charge, contacting the resultant product with hydrogen in the presence of a catalyst which comprises a metal selected from the group consisting of nickel, cobalt, tungsten, Ru, Rh, Re, Os and the noble metal hydrogenation catalysts (Pt and Pd), said catalyst being supported on a porous support (e.g., alumina, kieselguhr) at a temperature of 450–775° F., at a pressure of 500–3000 p.s.i.g., a liquid hourly space velocity of 0.1–10.0 and a hydrogen circulation rate of 0–20,000 standard cubic feet per barrel of said product of the first stage, the combination of conditions being selected to produce a jet fuel having an ASTM smoke point of at least 32±3.

CROSS REFERENCES TO RELATED APPLICATIONS

The present application is a continuation-in-part of Ser. No. 781,095 now Pat. No. 3,481,996, filed Dec. 4, 1968 of Merritt C. Kirk, Jr., entitled "Process for Hydrodesulfurization of Cracked Gas Oils and the Production of Dimethyldecalins and Fuel Oil Blending Components," said application (and, also, the present application) being a continuation-in-part of Ser. No. 532,298, filed Mar. 7, 1966 of Merritt C. Kirk, Jr., entitled "Process for Hydrodesulfurizing the Lower Boiling Fraction of a Cracked Gas Oil Blend" (which matured into U.S. Pat. No. 3,424,673 dated Jan. 28, 1969), said application, Ser. No. 532,298 having been copending with application Ser. No. 225,034, filed Sept. 20, 1962 (which matured into U.S. Pat. No. 3,256,353 on June 14, 1966, in the name of Frank R. Shuman, Jr., and Merritt C. Kirk, Jr., and titled "Preparation of Dimethyldecalins,") all of these above-referred to applications and patents being presently assigned to the Sun Oil Company to whom the present application is also assigned. Certain catalysts and reaction conditions in copending application, Ser. No. 636,493, filed May 5, 1967, of Ivor W. Mills, Glen R. Dimeler and Merritt C. Kirk, Jr., titled "Process for Preparing an Aromatic Oil and Non-Discoloring Rubber Composition Containing Said Oil," which is also assigned to Sun Oil Company, are useful in practicing the present invention. The disclosure of all of these patents and applications is hereby incorporated in the present application.

SUMMARY OF THE INVENTION

This invention relates to the production of jet fuel (such as "MACH 2 JP–5 or JP–5A") and special fuels requiring a luminometer number above 75 (e.g., 75–100) by hydrogenation of petroleum charges having a sufficient content of aromatic or olefinic hydrocarbons to cause them to have an ASTM smoke point below 28 (typically below 25). Preferably, the olefinic or aromatic hydrocarbons in such charges must be such that they can be converted by deep hydrogenation to materials boiling mainly within the boiling range specified for the desired jet fuel, or that the product stream containing the hydrogenation product of these aromatic hydrocarbons boils mainly within the range specified for the desired jet fuel. Also, the aromatic and/or olefin-containing stream, or the aromatics and/or olefins which are hydrogenated, should be capable of being converted, upon deep hydrogenation, to a product having a smoke point of at least 29 (more preferably, at least 35).

Among the streams which are suitable feed stocks (or charges) for conversion to jet fuel by such a deep hydrogenation process are the heavy recycle from reforming of naphtha, straight-run kerosene, catalytic gas oil, straight chain $C_{10}$–$C_{18}$ olefins (e.g., propylene tetramer and/or pentamer, etc.), distillate from thermally cracked tar sands bitumen, distillate fractions of such feed stocks and blends of two or more such feed stocks (including blends of distillate fractions of such feed stocks). One preferred charge stock is a straight-run kerosene containing at least 9 weight percent of aromatics (e.g., 9–16%) and which boils mainly in the range of 400–500° F. Another suitable charge stock is the 400–500° F. fraction from the catalytic cracking of gas oils (including hydrocracking).

Also suitable is a charge comprising jet fuel range distillate (e.g., boiling mainly in the range of 350–550° F.) from "coked" bitumen separated from tar sands (as by the hot water process). Typical of the prior art on such separations of bitumen from tar sands and further treatment to yield such distillates are U.S. Pat. No. 3,401,110 to Floyd et al. and "Plant Starts, Athabasca Now Yielding Its Hydrocarbons" in Oil and Gas Journal, Oct. 23, 1967, by Bachman, W., and Stormont, D. For the first hydrogenation stage of the present invention, such distillate from thermally cracked bitumen is preferably reduced to less than 35 weight percent olefins and aromatics by contact with a catalyst comprising cobalt and/or nickel and molybdenum (most preferably in sulfide form) and with 75–95% pure hydrogen at 800 p.s.i. to 3000 p.s.i. (preferably 1000–2000 p.s.i.g.), at 650–750° F., at a liquid hourly space velocity in the range of 0.25–2.5 (typically 0.75–1.25) at a gas recycle of at least 3000 s.c.f./bbl. (typically 4000–8000). Such distillate can also be advantageously blended with at least one other of the previously referred to charge stocks to produce a suitable charge for the two stage hydrogenation process of the present invention.

For all such charges, the desired deep hydrogenation can be effected by a two-stage catalytic hydrogenation process.

In the first stage, the petroleum charge stock is contacted with hydrogen (preferably 50–100% pure $H_2$, typically 80–90%) and a catalyst, primarily in order to remove sulfur and nitrogen compounds (however, some saturation can also be effected in this stage). The preferred catalyst will contain at least one member selected from the group consisting of nickel, cobalt, iron, molybdenum and tungsten and oxides and sulfides thereof, preferably on an inert porous carrier. Conditions include a temperature in the range of 500–785° F. (for example, 650–750° F.) at a pressure of 350–3000 p.s.i.g. (for example, 500–1500 p.s.i.g.) with a liquid hourly space velocity of 0.5 to 10.0 (for example, 1.0 to 6.0) and a hydrogen circulation rate of 0 to 20,000 standard cubic feet per barrel of charge stock (for example, 1,500–10,000 s.c.f./bbl.).

The product of this first "hydrodesulfurization" or "hydrorefining" step is then contacted in a second hydrogenation stage (preferably with 65–100% pure hydrogen) at temperatures from 450° F. to 775° F. (for example, 450°–700° F.) at a pressure of 500–3000 p.s.i.g. (for example, 500–1500 p.s.i.g.), a liquid hourly space velocity of about 0.25 to 10.0 (e.g., 1 to 10.0) and a hydrogen circulation rate of 0 to 20,000 (e.g., 2,000–10,000) s.c.f./bbl. of the product of the first stage.

The combination of the conditions in each of the two hydrogenation stages is selected to produce a superior jet fuel having a luminometer number of at least 75. Such a luminometer number is obtained when the ASTM smoke point is at least 29 (and, with our preferred charge stocks, when the ASTM smoke point is at least 33, more preferably, at least 35). The art is familiar with a correlation developed by the California Research Corporation, whereby the luminocity number can be determined from the ASTM smoke point, or vice versa. By this correlation, it has been established that, for example, the maximum luminocity number which can be obtained from petroleum based fuel having a smoke point of 25 is about 65 (and the minimum about 50). Similarly, the correlation shows that to obtain a luminocity number of 75 from a petroleum fuel, the ASTM smoke point must be at least 29, and may have to be as high as 35 (i.e., 32±3).

Conversely, for fuels having smoke points of 29, the luminocity can vary from about 62 to 75.

Preferred catalysts in the second hydrogenation stage are those which comprise a metal selected from the group consisting of nickel, cobalt, tungsten, molybdenum, Ru, Rh, Os, Ir and the noble metal hydrogenation catalysts (e.g., Pt, Pd). Preferably, said catalyst is supported on a porous refractory support which does not have appreciable cracking activity at the contact conditions (for example, alumina, kieselguhr, carbon, etc.). The second stage catalyst can also comprise sulfides (or sulfided oxides) of such metals when at least a trace (5–50 p.p.m.) of sulfur (preferably as $H_2S$ or organic sulfides) is maintained in the charge to the second stage.

Generally, when the charge stock comprises acyclic $C_9$–$C_{18}$ olefins, a straight-run kerosene, or a fraction derived from hydrocracking a gas oil (or from hydrocracking a heavy distillate from crude oil), or comprises blends of at least two such charges, the resulting product from the second hydrogenation stage will have a luminometer number of at least 75 when the product of the second hydrogenation stage contains less than 8 weight percent of aromatics and olefins. More preferably, the second stage product contains less than 4 percent (typically 0–2%) of aromatics and less than 10% of olefins.

However, for any given charge stock, it is within the skill of the art to determine, by a series of experiments, the degree of hydrogenation which is necessary to produce a second stage product having the required luminometer number.

When the feed stock is highly aromatic, such as a nonhydrocracked catalytic gas oil, coked distillate from tar sands bitumen, or the recycle fraction from the reforming of naphtha, non-destructive hydrogenation alone (even in two stages) may not be sufficient processing to produce a jet fuel having a luminometer number of at least 75. With such highly aromatic feed stocks (which upon deep hydrogenation convert to products having a high content of naphthene hydrocarbons) it is frequently desirable to reduce the proportion of naphthenic carbon atoms to paraffinic carbon atoms in the final fuel. This can be effected by the means taught in the above-referred to copending application, Ser. No. 781,095 and in its copending parent application which matured into U.S. Pat. No. 3,424,673.

For example, a fraction which contains dimethylnaphthalenes and boils mainly in the range of 480–540° F. can be alkylated with a $C_2$–$C_9$ hydrocarbon. The alkylated fraction can then be distilled to recover a fraction boiling substantially within the range of 480–540° F. (and containing a lower proportion of aromatic hydrocarbons than were present in the charge to the alkylation reactor) and a higher boiling fraction which is useful as a plasticizer. The resulting 480–540° F. distillate fraction of the alkylate can then be catalytically hydrogenated in a second step to produce a second stage hydrogenation product having a luminometer number of at least 75. If, with a particular charge stock and particular alkylation and distillation processes, the second stage hydrogenation product has a luminometer number less than 75, the luminometer number can be increased to at least 75 by utilizing the additional process step taught, for example, in the previously referred to application, Ser. No. 781,095, wherein the product of the second hydrogenation stage is distilled to recover a fraction containing at least 90% dimethyldecalins and boiling in the range of 400–450° F. The remaining fractions of this distillation can be especially useful as a jet fuel or as componets of a jet fuel having a luminometer number of at least 75.

As an alternative, the aromatic content of a catalytic gas oil (or other highly aromatic charge) can be reduced by extraction with an acid (e.g., $H_2SO_4$) or with an aromatic selective solvent such as phenol or furfural, and the resultant aromatic-depleted product can be utilized as the feed to either the first stage or to the second stage of the above-referred two-stage hydrogenation process.

Another alternative open to the refiner is to produce a second stage hydrogenation product which has a luminometer value less than 75, and to then feed this product to a hydrocracking zone under conditions such that the hydrocracked product can be distilled to produce a jet fuel having the desired luminometer value.

Another alternative with highly aromatic feeds, such as catalytic gas oil, is to conduct the hydrogenation in at least one stage under conditions such that some hydrocracking occurs (e.g., 10–30 vol. percent conversion to lower boiling products). In such hydrotreating combined with hydrocracking, it is preferred that the carrier for the hydrogenation catalyst have some cracking activity (or acidities), such as can be obtained with an acidic alumino-silicate zeolite which is substantially free from alkali metals (for example, 10% of Hy zeolite in a silica alumina matrix). Another catalyst which is useful for both hydrogenating and also for partially hydrocracking (especially in the second hydrogenation stage) comprises nickel and tungsten on an alumino-silicate carrier (such as the commercially available catalyst sold by Harshaw Chemical under the trade name Ni–4401).

Where hydrocracking activity is not desired (or is to be minimized), a suitable catalyst for deep hydrogenation is Ni–W on $Al_2O_3$ (such as the commercially available catalyst from Harshaw Chemical having the trade designation Ni–4403). For example, one such type of commercial catalyst contains 7.6 weight percent NiO, 23.9 weight percent $WO_3$ and the remainder is either $Al_2O_3$ or an alumino-silicate containing 43% $Al_2O_3$. Another suitable catalyst for the second stage is sold under the trade designation Filtrol 500-8 and is Ni-Co-Mo on $Al_2O_3$. In the first stage, the preferred catalysts comprise cobalt and molybdenum oxides on a carrier (such as bauxite or alpha-alumina) or nickel-molybdenum oxides on a carrier. Preferably, these catalysts are presulfided.

When the charge stock which is to be converted into a jet fuel having a luminometer number of at least 75 has a high content of aromatic hydrocarbons, such as a 400–500° F. gas oil (or coker distillate from tar sands bitumen), a preferred process is that shown in parent application, Ser. No. 532,298 (now U.S. Pat. No. 3,424,673) wherein the 400–550° F. charge stock (which can be a catalytic gas oil) is hydrodesulfurized (as in the first stage of the present process) and the hydrodesulfurized product is separated, by distillation, into a fraction boiling below 480° F., a fraction boiling above 540° F., and a fraction containing dimethylnaphthalene and boiling mainly in the range of 480–540° F. The 480–540° F. feed fraction is then catalytically hydrogenated to an aromatics content less than 8% under hydrogenation conditions comprising a temperature in the range of 400–1000° F., a pressure in the range of 500–4000 p.s.i.g., a liquid hourly space velocity in the range of 0.1–10.0 and in the presence of 500–15,000 s.c.f. of hydrogen per barrel of hydrocarbon feed. The hydrogenated product is distilled to separate a fraction containing at least 90% dimethyldecalin and boiling in the range of 400–450° F. Most preferably, the first hydrogenation stage is conducted under conditions such that the first stage hydrodesulfurized product contains less than 300 p.p.m. (preferably under 50 p.p.m.) of sulfur. All of the material in the 400–550° F. fraction which is the feed to the first stage and which is not recovered as dimethyldecalins, can be combined with the desulfurized fraction boiling below 480° F. to produce a jet fuel having a luminometer value of at least 75.

ILLUSTRATIVE EXAMPLES

A straight-run kerosene meeting the specifications for JP–5 and having the properties listed in Table I under the heading "charge," and containing 12.4% aromatics, was hydrodesulfurized in the presence of a sulfided catalyst comprising cobalt and molybdenum oxides on alumina (which catalyst was commercially available under the trade name Aero HDS–2). The hydrodesulfurization was conducted at 750 p.s.i.g. and 600° F. at a liquid hourly space velocity of 2 and with a hydrogen recycle of 5,000 s.c.f. per barrel of charge. The hydrodesulfurized product was then charged to a second hydrogenation stage wherein the catalyst was Ni on kieselguhr. The second stage hydrogenation was conducted at 500° F. and at 500 p.s.i.g., at a liquid hourly space velocity of 0.75 with a hydrogen recycle of 10,000 s.c.f./bbl. of feed. The product of the second hydrogenation stage contained only 0.05% by weight of aromatic hydrocarbons and had a smoke number of 35. Other properties of this two-stage product, are listed in the table under the heading JP–5A. From the California Research correlation, a smoke number of 35, for the second stage product, corresponds to a luminometer number of 82. It can be seen from the charge properties listed in Table I that this charge is a paraffinic kerosene.

Table I also lists, for purposes of comparison, runs made on the same straight-run kerosene wherein only a single hydrogenation (or hydrodesulfurization) stage was used. Also shown, for comparison purposes, are similar runs made on propylene tetramer (which is a product obtained by the catalytic polymerization of propylene in the presence of a phosphoric acid on kieselguhr catalyst). The hydrogenated propylene tetramer makes an excellent blending stock for incorporating with our two-stage hydrogenation products in order to make products having luminometer values above 85 (surprisingly, such hydrogenated acyclic olefins can be produced which have luminometer values of 100).

TABLE I.—PREPARATION OF JET FUELS

| | Charge stock | | | | | | |
|---|---|---|---|---|---|---|---|
| | JP–5 | | | | | Propylene tetramer | |
| | Operation | | | | | | |
| | Deep hydrogenation of aromatics | | | [Moderate hydrogenation of aromatics | | Saturation of olefins | |
| | 2 stages | | | | | | |
| Catalyst type | CoMo[1] | Ni[2] | Ni-W | Ni-W | CoMo | CoMo | |
| Reactor conditions: | | | | | | | |
| Operating pressure, p.s.i.g | 750 | 500 | 1,800 | 750 | 750 | 750 | 500 |
| Gas recycle rate, s.c.f./bbl | 5,000 | 10,000 | 5,000 | 0 | 0 | 0 | 3,000 |
| Temperature, ° F | 725 | 500 | 575 | 600 | 600 | 600 | 600 |
| Liquid hourly space velocity | 2 | 0.75 | 1 | 1.5 | 1 | 2 | 2 |
| Inspection data | Charge | | | | | | |
| Gravity, °API | 43.9 | 45.3 | 44.8 | 44.4 | 44.1 | 52.1 | 54.2 | 54.1 |
| Distillation (Engler) ° F.: | | | | | | | |
| 10% | 393 | 392 | 393 | 388 | 396 | 358 | 360 | 363 |
| 50% | 419 | 418 | 418 | 419 | 418 | 365 | 370 | 371 |
| 90% | 465 | 452 | 444 | 449 | 448 | 380 | 383 | 384 |
| Aromatics, weight percent | 12.4 | 0.05 | 4.0 | | 9.8 | | | |
| Olefins, weight percent | | | | | | 92.4 | 6.4 | 3.8 |
| Freezing point, ° F | | −54 | −51 | −58 | −58 | | <−76 | <−76 |
| Flash point, (c.c.), ° F | 154 | 148 | | | 146 | 136 | 136 | 138 |
| Estimated Luminometer No.[3] | | 82 | | 69 | 62 | | 95 | 94 |
| Smoke point | 24 | 35 | | 30 | 27 | | 40 | 39 |
| Aniline point, ° F | 149.5 | 164.6 | | | | | 175.0 | 176.4 |

[1] Desulfurization step.
[2] Deep hydrogenation step.
[3] Luminometer No. estimated from smoke point.

The invention claimed is:

1. The method of manufacturing a jet fuel which comprises contacting a straight-run paraffinic kerosene having an API gravity of about 43.9 with hydrogen in the presence of a hydrogenation catalyst formed from at least one member selected from the group consisting of nickel, cobalt, molybdenum and tungsten and oxides and sulfides thereof, on an inert porous carrier, at a temperature of 500° F. to below 650° F., at a pressure of 500 to 1500 p.s.i.g. with a liquid hourly space velocity of 1.0 to 6.0 and a hydrogen circulation rate of 1,500 to 10,000 standard cubic feet per barrel of kerosene, contacting the resultant product with hydrogen in the presence of a catalyst which comprises a metal selected from the group consisting of nickel, cobalt, tungsten, molybdenum and the noble metals, said catalyst being supported on a porous refractory support selected from the group consisting of alumina and kieselguhr, at a temperature of 450 to 700° F. at a pressure of 500 to 1500 p.s.i.g., a liquid hourly space velocity of 0.5 to 10.0 and a hydrogen circulation rate of 2,000 to 10,000 standard cubic feet per barrel of said product of the first stage, the combination of conditions being selected to produce a superior jet fuel having a luminometer number of at least 75.

2. The method of manufacturing a jet fuel which comprises contacting a straight-run paraffinic kerosene having an API gravity of about 43.9 with hydrogen in the presence of a hydrogenation catalyst formed from at least one member selected from the group consisting of nickel, cobalt, molybdenum and tungsten and oxides and sulfides thereof, on an inert porous carrier at a temperature of 500° F. to below 650° F., at a pressure of 500 to 1500 p.s.i.g. with a liquid hourly space velocity of 1.0 to 6.0, and a hydrogen circulation rate of 1,500 to 10,000 standard cubic feet per barrel of kerosene and cocurrently contacting the resultant product with hydrogen in the presence of a catalyst which comprises nickel metal, said catalyst supported on a porous refractory support consisting of kieselguhr at a temperature of 450 to 630° F. at a pressure of 500 to 1500 p.s.i.g., a liquid hourly space velocity of 0.5 to 5.0 and a hydrogen circulation rate of 2,000 to 10,000 standard cubic feet per barrel of said product of the first stage, the combination of conditions being selected to produce a superior jet fuel having a luminometer number of at least 75.

3. The method of manufacturing a jet fuel which comprises contacting a straight-run paraffinic kerosene having an API gravity of about 43.9 with hydrogen in the presence of a cobalt-molybdenum catalyst at a temperature of 500° F. to below 650° F., at a pressure of 500 to 1500 p.s.i.g. with a liquid hourly space velocity of 1.0 to 6.0, and a hydrogen circulation rate of 1,500 to 10,000 standard cubic feet per barrel of kerosene and contacting the resultant product with hydrogen in the presence of a catalyst comprising a metal selected from the group consisting of nickel, cobalt, tungsten, molybdenum and the noble metals, said catalyst supported on a porous refractory support selected from the group consisting of alumina and kieselguhr at a temperature of 450 to 630° F. at a pressure of 500 to 1500 p.s.i.g., a liquid hourly space velocity of 0.5 to 5.0 and a hydrogen circulation rate of 2,000 to 10,000 standard cubic feet per barrel of said product o fthe first stage, the combination of conditions being selected to produce a superior jet fuel having a luminometer number of at least 75.

4. The method set forth in claim 3 wherein the second stage catalyst comprises nickel.

5. The method set forth in claim 1 wherein the second stage catalyst is nickel on kieselguhr.

6. Process of producing a jet fuel having a luminometer number of at least 75 comprising contacting a straight-run paraffinic kerosene having an API gravity of about 43.9, which is capable of being converted, upon deep hydrogenation, to a product having an ASTM smoke number greater than 35, with hydrogen in the presence of a hydrogenation catalyst formed from at least one member selected from the group consisting of nickel, cobalt, iron, molybdenum and tungsten and oxides and sulfides thereof, on an inert porous carrier, at a temperature of at least 500 and below 650° F. a pressure of 350–2000 p.s.i.g., a liquid hourly space velocity of 0.5–10.0 and a hydrogen circulation rate of 0 to 20,000 s.c.f. per barrel of said charge, contacting the resultant product with hydrogen in the presence of a catalyst which comprises a metal selected from the group consisting of nickel, cobalt, tungsten, molybdenum, Ru, Rh, Re, Os, Pt and Pd, said catalyst being supported on a porous support at a temperature of 450–775° F., at a pressure of 500–3000 p.s.i.g., a liquid hourly space velocity of 0.1–10.0 and a hydrogen circulation rate of 0–20,000 standard cubic feet per barrel of said product of the first hydrogenation stage, the combination of conditions being selected to produce a jet fuel having an ASTM smoke point of at least 29.

7. Process of claim 6 wherein the product of said second stage has an ASTM smoke point of at least 35.

8. Process of claim 6 wherein the product of said second stage has an ASTM smoke point of at least 39.

9. Process of claim 7 wherein said charge to the first hydrogenation stage meets the specifications for JP–5 jet fuel and has an ASTM smoke point no greater than 24 and wherein in said first stage the pressure is at least 1500 p.s.i.g. and the catalyst comprises cobalt and molybdenum in oxide or sulfide form and wherein the second hydrogenation stage is at a pressure of at least 1800 p.s.i.g. and the second stage catalyst comprises nickel in metallic, oxide or sulfide form and wherein the gas recycle in each said stage is at least 5000 s.c.f./bbl.

References Cited

UNITED STATES PATENTS

| | | | |
|---|---|---|---|
| 3,125,503 | 3/1964 | Kerret et al. | 208—15 |
| 3,126,330 | 3/1964 | Zimmerscheid et al. | 208—15 |
| 3,155,740 | 11/1964 | Schneider | 208—15 |
| 3,185,739 | 5/1965 | Gray et al. | 208—15 |
| 3,369,998 | 2/1968 | Bercik et al. | 208—210 |
| 3,367,860 | 2/1968 | Barnes et al. | 208—15 |
| 3,175,970 | 3/1965 | Bercik et al. | 208—212 |

FOREIGN PATENTS

| | | | |
|---|---|---|---|
| 836,104 | 6/1960 | Great Britain | 208—15 |

HERBERT LEVINE, Primary Examiner

U.S. Cl. X.R.

208—15, 143